(12) United States Patent
Humphrey

(10) Patent No.: US 8,316,628 B2
(45) Date of Patent: Nov. 27, 2012

(54) GRASS TREATMENT UNIT WITH ADJUSTABLE HOOD AND GRASS TREATMENT INSERT

(76) Inventor: John L. Humphrey, St. Charles, MO (US)

( * ) Notice: Subject to any disclaimer, the term of this patent is extended or adjusted under 35 U.S.C. 154(b) by 0 days.

(21) Appl. No.: 12/247,365

(22) Filed: Oct. 8, 2008

(65) Prior Publication Data

US 2010/0083628 A1    Apr. 8, 2010

(51) Int. Cl.
*A01D 34/53*    (2006.01)
(52) U.S. Cl. ........... 56/249; 56/249.5; 56/294; 56/320.1
(58) Field of Classification Search ............ 56/2, 7, 56/249, 294, 249.5, 320.1
See application file for complete search history.

(56) References Cited

U.S. PATENT DOCUMENTS

| | | | | |
|---|---|---|---|---|
| 1,607,382 A | * | 11/1926 | Zakrzewsky | 56/238 |
| 2,283,161 A | * | 5/1942 | Booton | 56/249.5 |
| 2,734,328 A | * | 2/1956 | Wood | 56/16.7 |
| 3,783,592 A | * | 1/1974 | Schraut | 56/13.3 |
| 5,261,213 A | | 11/1993 | Humphrey | |
| 6,467,245 B1 | | 10/2002 | Humphrey | |
| 6,647,703 B2 | | 11/2003 | Oliver | |
| 6,945,021 B2 | | 9/2005 | Michel | |

FOREIGN PATENT DOCUMENTS

| | | |
|---|---|---|
| GB | 2350998 A | 12/2000 |
| WO | 2007/085820 A1 | 8/2007 |

* cited by examiner

*Primary Examiner* — Alicia Torres
(74) *Attorney, Agent, or Firm* — Grace J. Fishel

(57) ABSTRACT

A grass treatment unit with an adjustable hood for use with various grass treatment inserts of different diameter for verticutting, scarifying, etc. An open topped bearing socket is provided for mounting the grass treatment insert for rotation. A hood is mounted on a slide for spacing the hood in a selected position with respect to the grass treatment insert. The grass treatment insert has a shaft with ball bearings on opposite ends which are housed within a bearing housing. A handle is provided on the bearing housing for lifting the grass treatment insert.

10 Claims, 16 Drawing Sheets

GRASS TREATMENT UNIT WITH ADJUSTABLE HOOD AND GRASS TREATMENT INSERT

BACKGROUND OF THE INVENTION

1. Field of the Invention

The present invention relates to a grass treatment insert and a grass treatment unit with an adjustable hood for use on a mowing machine.

2. Brief Description of the Prior Art

Several manufacturers offer grass treatment units which are designed to fit existing greensmowers as replacements for the grass cutting units. Inserts for use in the grass treatment units are provided to accomplish various greens grooming practices, including vibratory and non-vibratory rolling, verticutting, scarifying, grooming, spiking, slitting, slicing, brushing and the like.

Typically the grass treatment unit has a frame with sidewalls and is mounted on front and rear rollers. The grass treatment insert is mounted in the frame to rotate about an axis which extends generally parallel to the ground surface over which the grass treatment unit is moved and perpendicular to the direction of travel. Rotation of the grass treatment insert is driven in the direction of travel by a hydraulic motor or the like which is powered off the greensmower.

A force is applied to grass clippings or other material produced during the grass treatment operation through contact with the rotating grass treatment insert or due to a wind force generated by the rotating insert. A hood is positioned behind and upwardly and forwardly of the grass treatment insert to direct the material into a clippings basket which is provided at the front of the grass treatment unit. Ambient air is drawn into the space between the grass treatment insert and the hood from under the sidewalls and through any vent holes which may be provided. The geometry of the space between the grass treatment insert and the hood affects the kinetic energy applied to the material.

Different grass treatment inserts have different diameters. For example, a scarifier typically has a larger diameter than a verticutter. Some manufacturers of grass treatment units provide a fixed placement for the hood, thereby achieving less than ideal discharge with inserts for different practices. Other manufacturers provide the grass treatment insert and hood as a combined part but this complicates installation which requires tools and materially increases the cost to a user whose practice requires different inserts.

BRIEF SUMMARY OF THE INVENTION

In view of the above, it is an object of the present invention to provide a grass treatment unit with an adjustable hood which may be used with grass treatment inserts having different diameters. It is another object to provide a grass treatment unit with bearing sockets on the sidewalls of the frame into which grass treatment units may be inserted and removed without tools. It is also an object to provide a grass treatment insert which can be easily handled for insertion into the grass treatment unit. Other objects and features of the invention will be part apparent and in part pointed out hereinafter.

In accordance with the invention, a grass treatment unit adapted to fit existing greensmowers has a frame with sidewalls and at least one connecting cross member. The frame is mounted on front and rear rollers.

An open topped bearing socket is attached to the sidewalls for mounting a grass treatment insert for rotation between the sidewalls. A movable hood is positioned behind and extending upwardly and forwardly of the grass treatment insert. The hood is mounted on a slide for spacing the hood in a selected position with respect to the grass treatment insert. Spring biased plungers are provided for locking the grass treatment insert in the bearing sockets and for locking the slide in a selected spacing for the hood. Handles are provided on the grass treatment insert for installing and removing it from the grass treatment unit.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
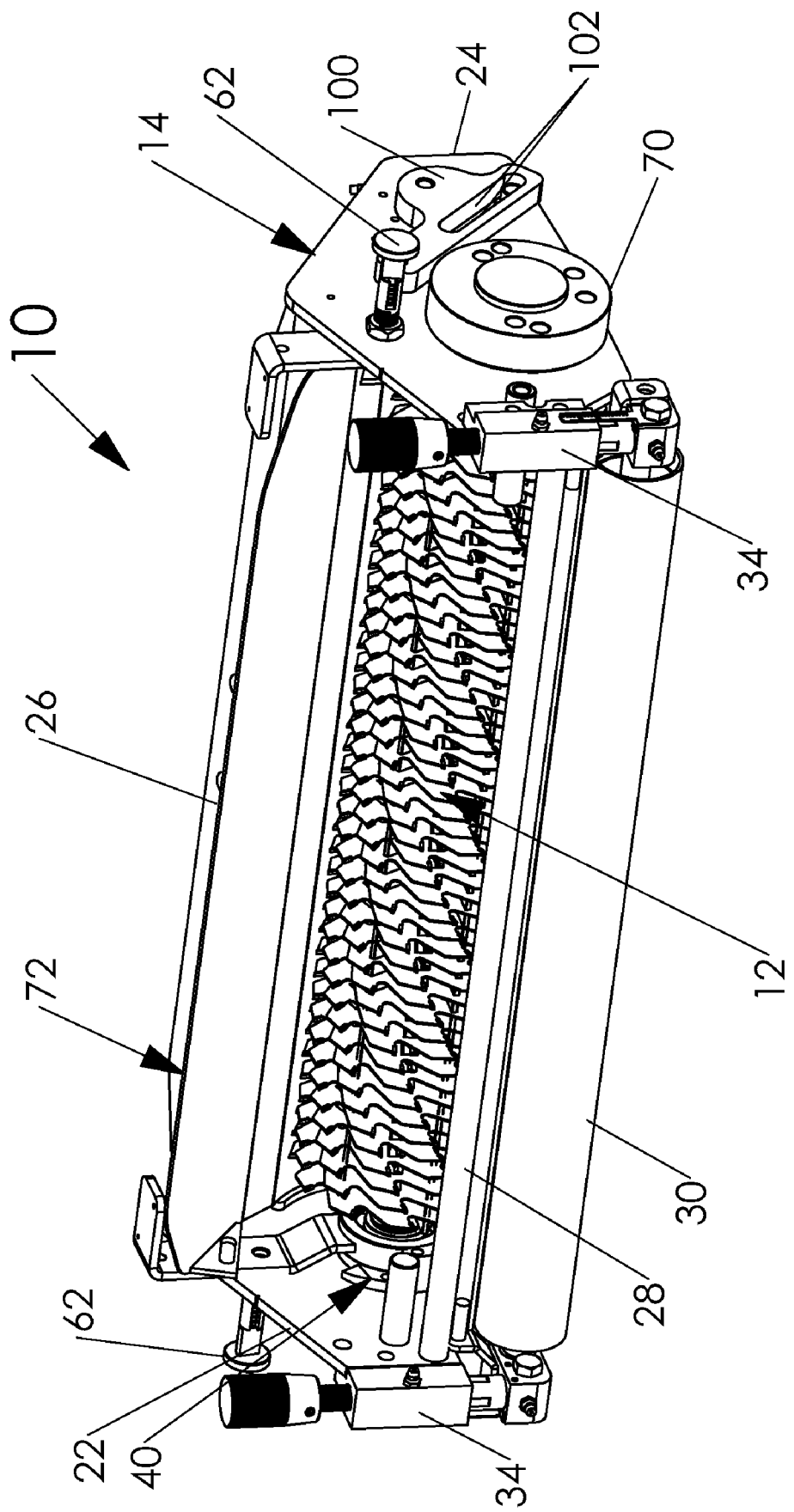
FIG. 1 is a front perspective view of a grass treatment unit in which a grass treatment insert is installed, FIG. 2. is a front perspective view similar to FIG. 1 but with the grass treatment insert removed.
Figure 2:
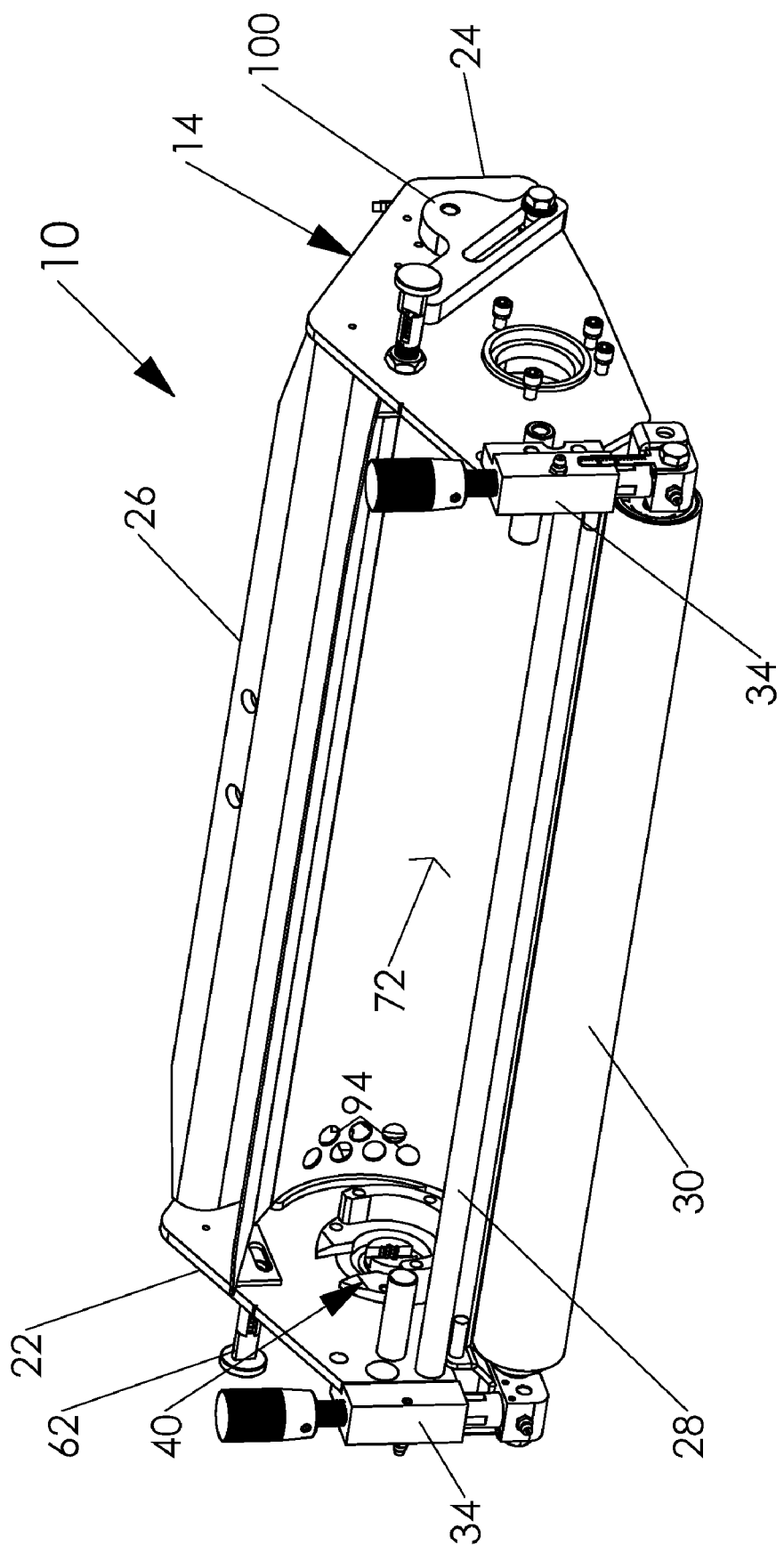
Figure 3:
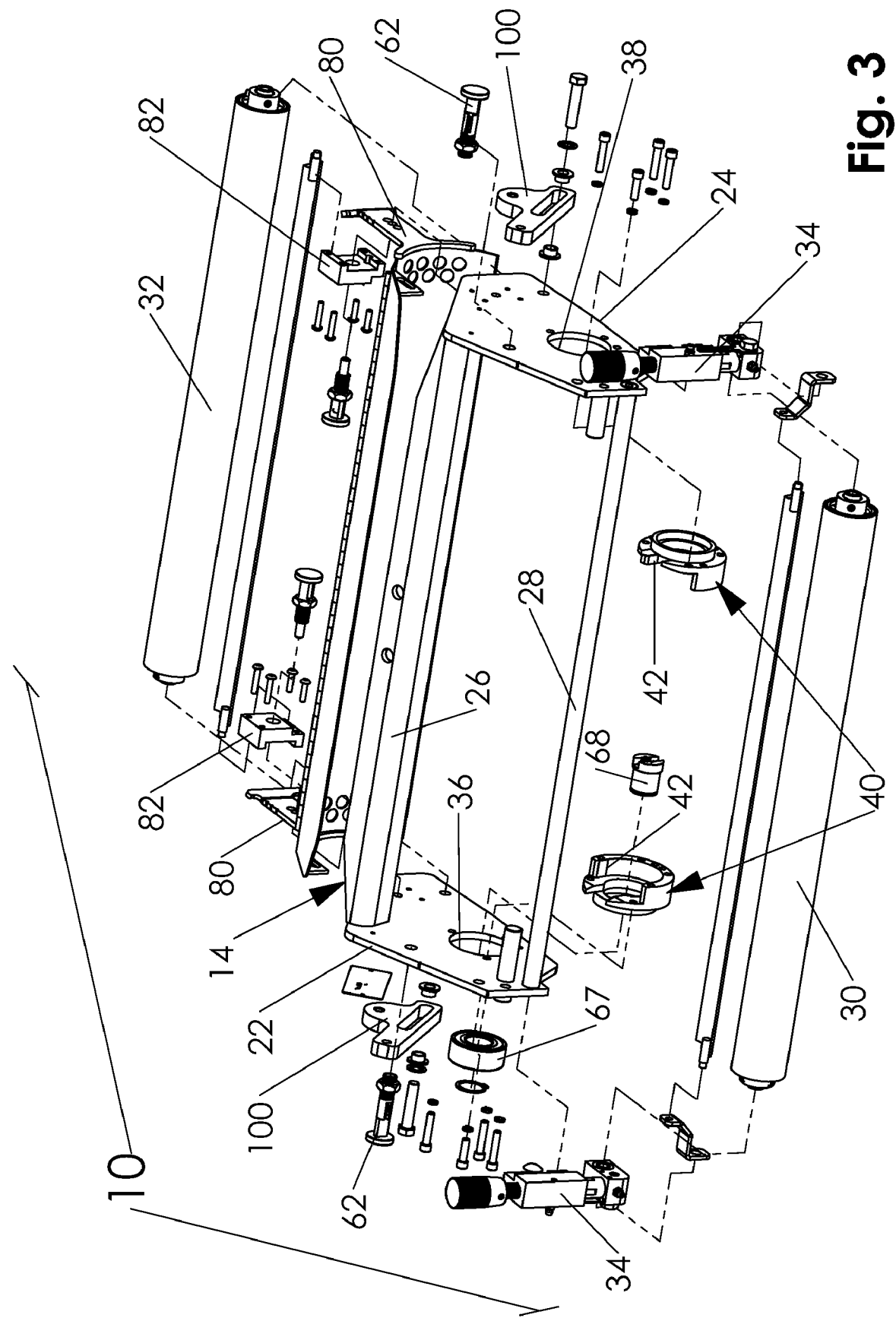
FIG. 3 is an front exploded perspective view of the grass treatment unit.
Figure 4:
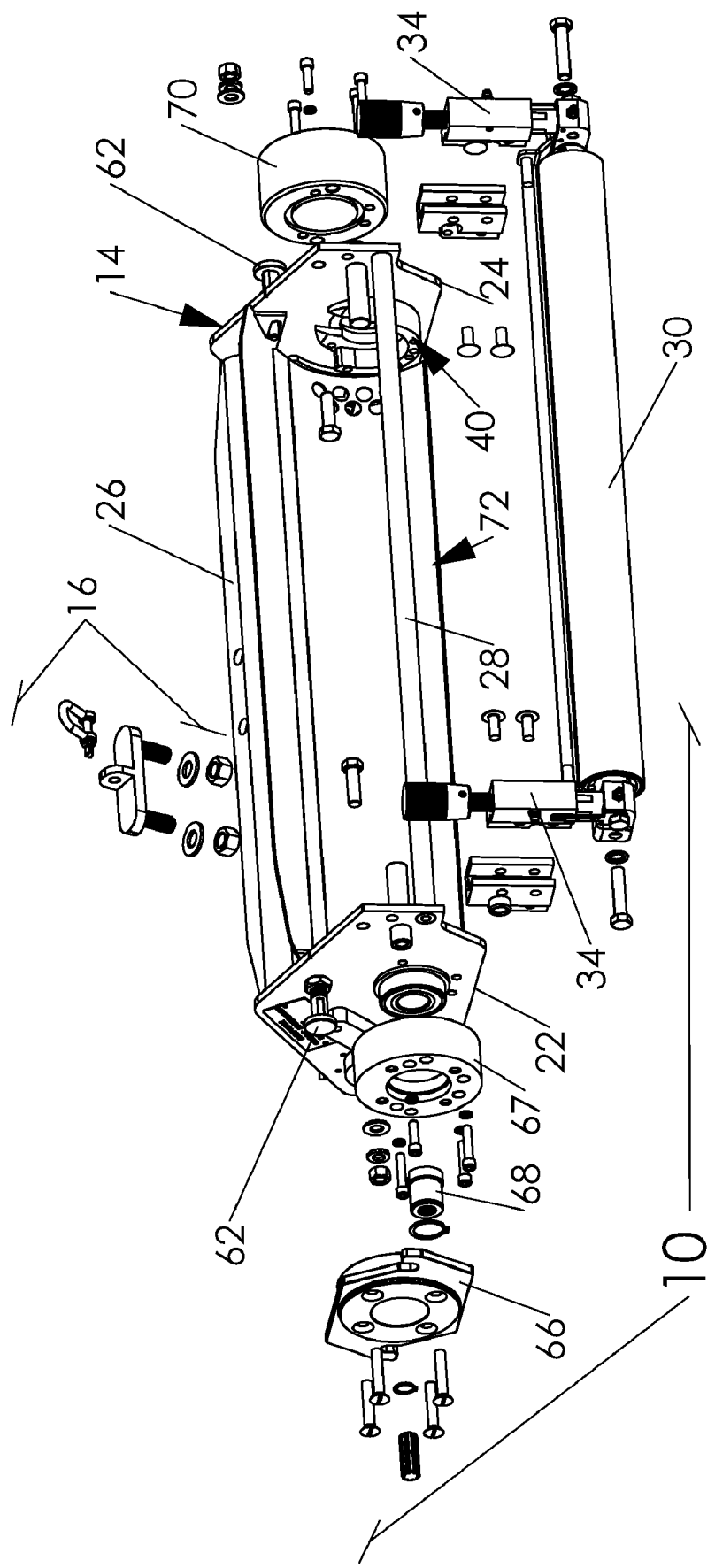
FIG. 4 is a front partially exploded perspective view of the grass treatment unit with an adapter, adapter plate and drive coupler suitable for mounting the unit on a John Deere greensmower and a front roller with depth of cut adjusters shown exploded from an assembled frame of the grass treatment unit.
Figure 5:
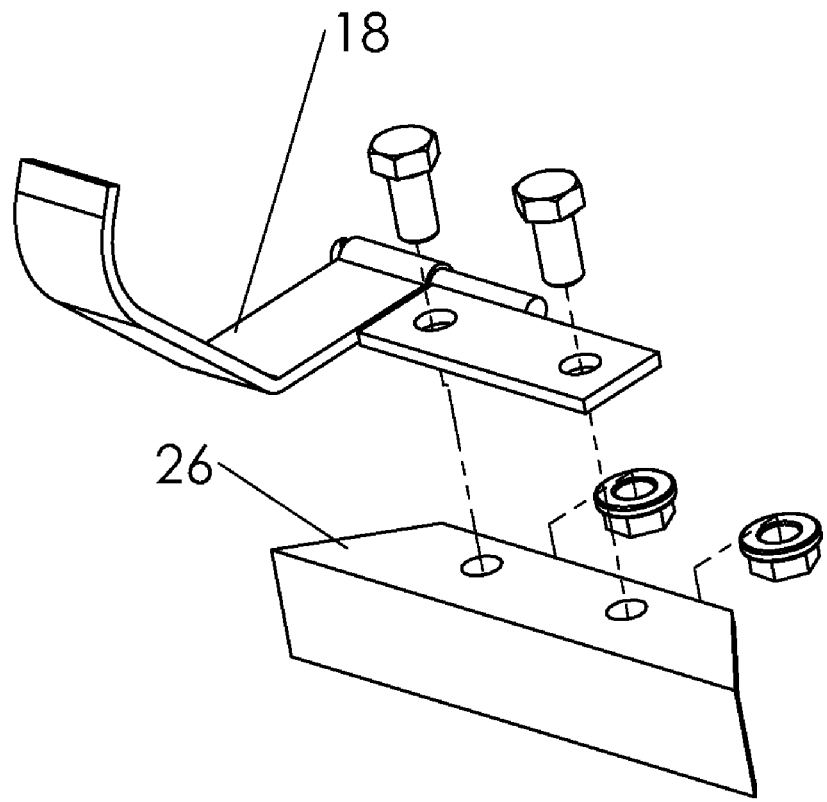
FIG. 5 is front perspective view of an adapter for mounting the frame of the grass treatment unit on a Jacobsen greensmower.
Figure 6:
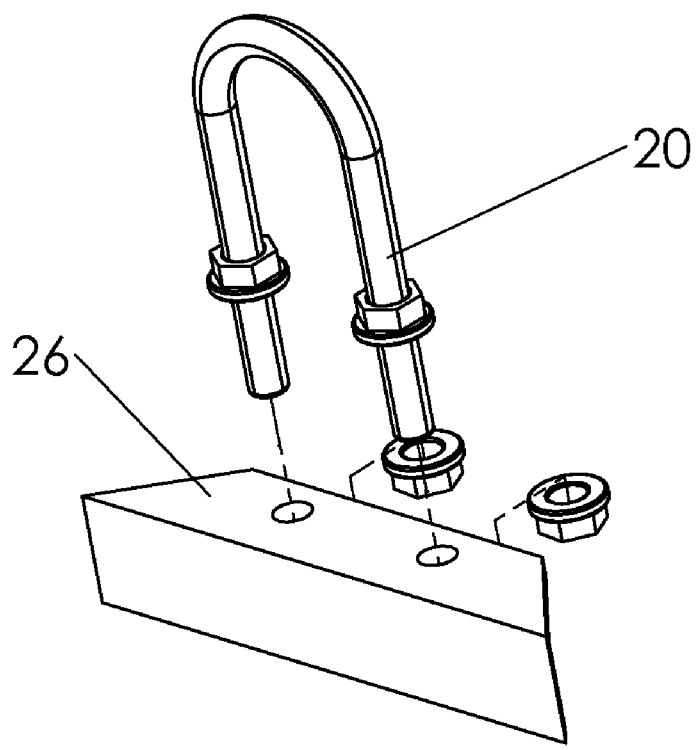
FIG. 6 is a front perspective view of an adapter for mounting the frame of the grass treatment unit on a Toro greensmower.

Referring to the drawings more particularly by reference character, a grass treatment unit 10 and a grass treatment insert 12 in accordance with the present invention are shown in FIG. 1. Grass treatment unit 10 includes a frame 14 as shown in FIGS. 2-3 which through adapters 16, 18 or 20 as shown in FIGS. 4, 5 and 6 may be used to suspend frame 14 from greensmowers built by different manufacturers. For example, adapter 16 as shown in FIG. 4 is for mounting frame 14 on a John Deere mower while adapters 18 and 20 are for use with a Jacobsen and Toro greensmower, respectively. Adapters such as 16, 18 and 20 and the like allow the same frame 14 to be used with greensmowers from different manufacturers.

Frame 14 includes right and left sidewalls 22, 24, respectively, which are connected together with cross members 26 and 28. Frame 14 is supported on front and rear rollers 30, 32, respectively. Front roller 30 may be mounted to frame 14 through a depth of cut adjuster 34, one of which is provided at opposite ends thereof. Adjusters 34 permits an operator to vary the height of frame 14 relative to front roller 30 and thereby adjust the depth of cut of grass treatment insert 12.

Figure 15:
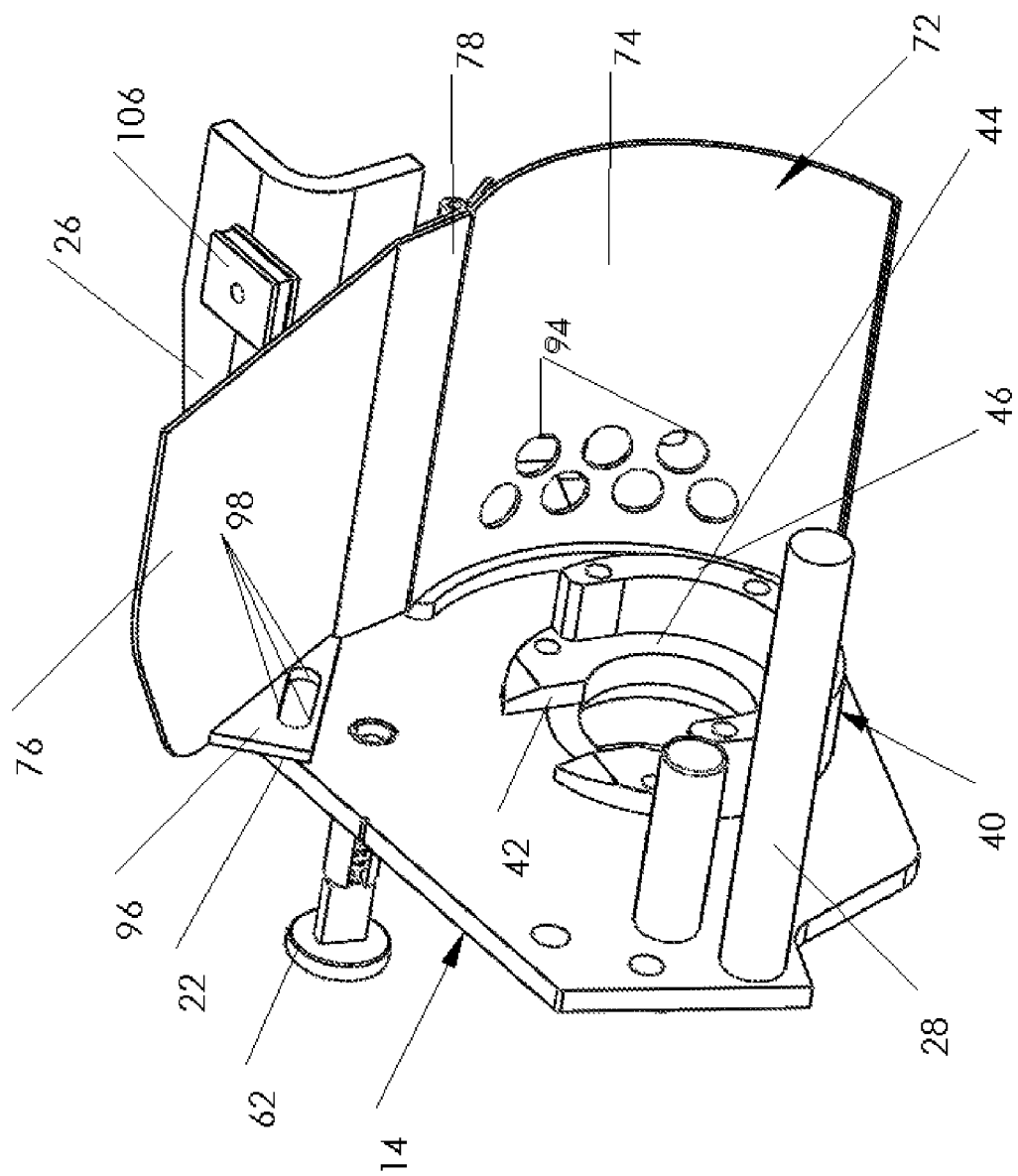
FIG. 15 is a front perspective view similar to FIG. 14 but showing the hood released from the plunger and an upper section of the hood pivoted upwardly; and, FIG. 16 is an exploded perspective view on an enlarged scale of a bearing socket with a detachable front wall.
Figure 16:
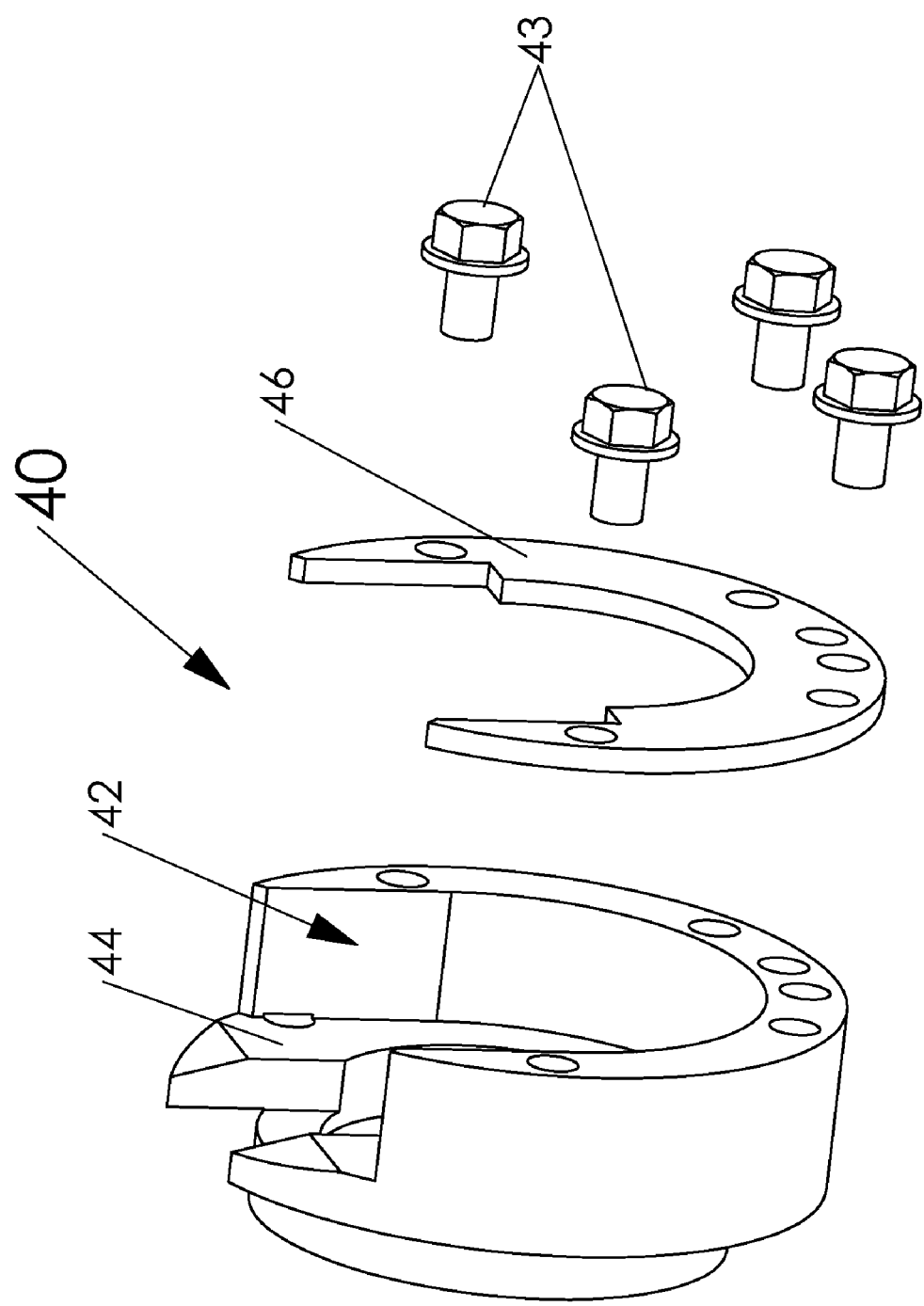

Aligned apertures 36, 38 (FIG. 3) are provided in sidewalls 22, 24, respectively, for use in attaching a drive means to grass treatment insert 12 as more particularly described below. A bearing socket 40 is mounted on each of sidewalls 22, 24 in registry with apertures 36, 38. Bearing sockets 40 have an open top 42 and are interchangeable left to right and may be identical. Bearing sockets 40 are attached to sidewalls 22, 24 with bolts 43 or other suitable fasteners (FIGS. 14-16) the holes for which in sidewalls 22, 24 are arranged in a pattern such open top 42 of both bearing sockets 40 are canted towards the front of grass treatment unit 10 to facilitate insertion of grass treatment insert 12. As best seen in FIG. 16, a back wall 44 of bearing socket 40 is generally horseshoe shaped while a front wall 46 provides a generally crescent shaped rim for use in retaining grass treatment insert 12 in socket 40. Front wall 46 may be integrally formed or provided as a separate part as shown in FIG. 16. Crescent shaped front wall 46 may be minimized or omitted in the bearing socket on the non drive side to allow clearance for ease of installation of grass treatment insert 12. It omitted on the drive side, one or more heads of the bolts 43 attaching sockets 40 to sidewalls 22, 24 may be enlarged with washers or the like to serve as a retainer for holding the drive key 60 and the drive coupler 68 as more particularly described below together. In the latter instance, bearing sockets 40 may be identical.

Figure 7:
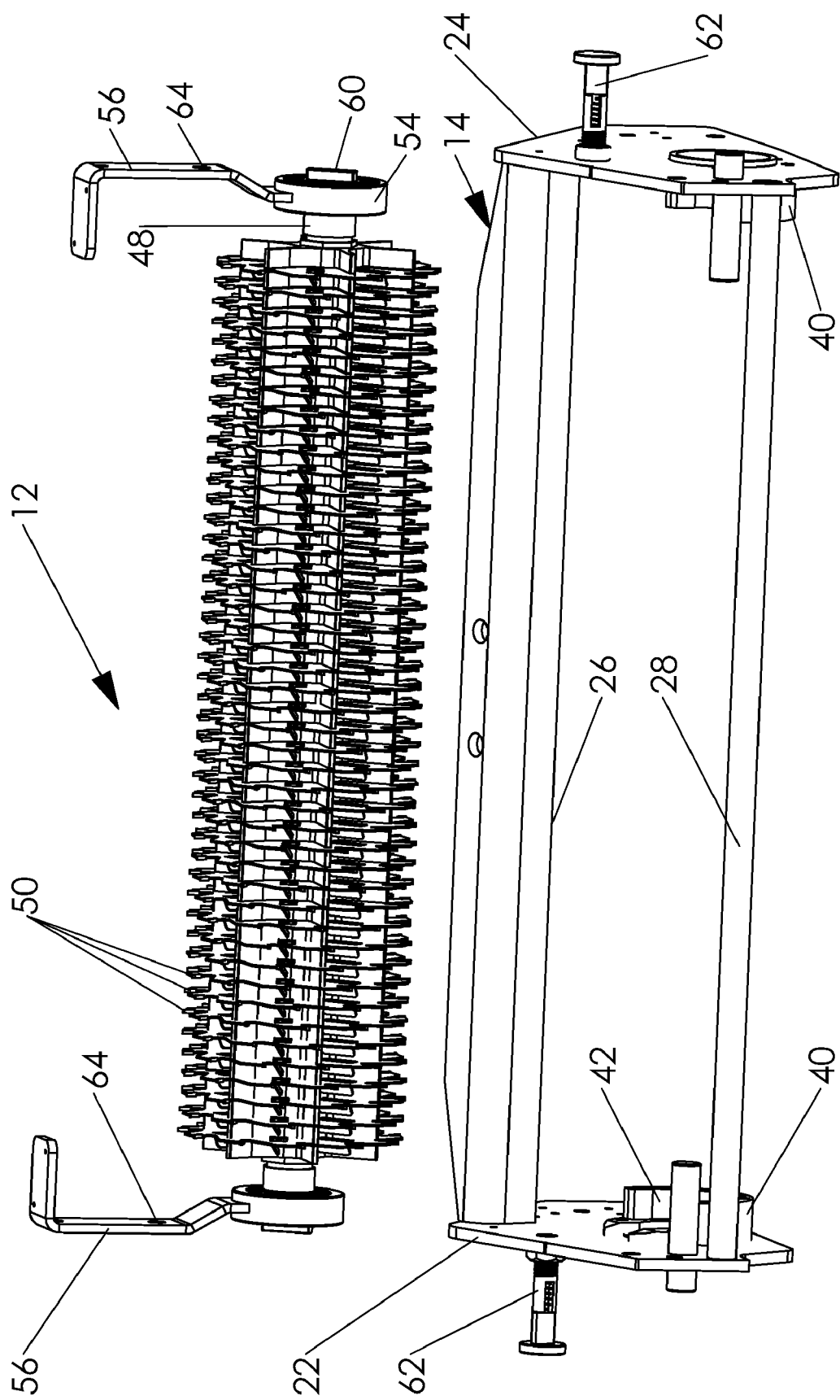
FIG. 7 is a front perspective view of the grass treatment insert in position to be inserted into bearing sockets on the sidewalls of the frame.
Figure 8:
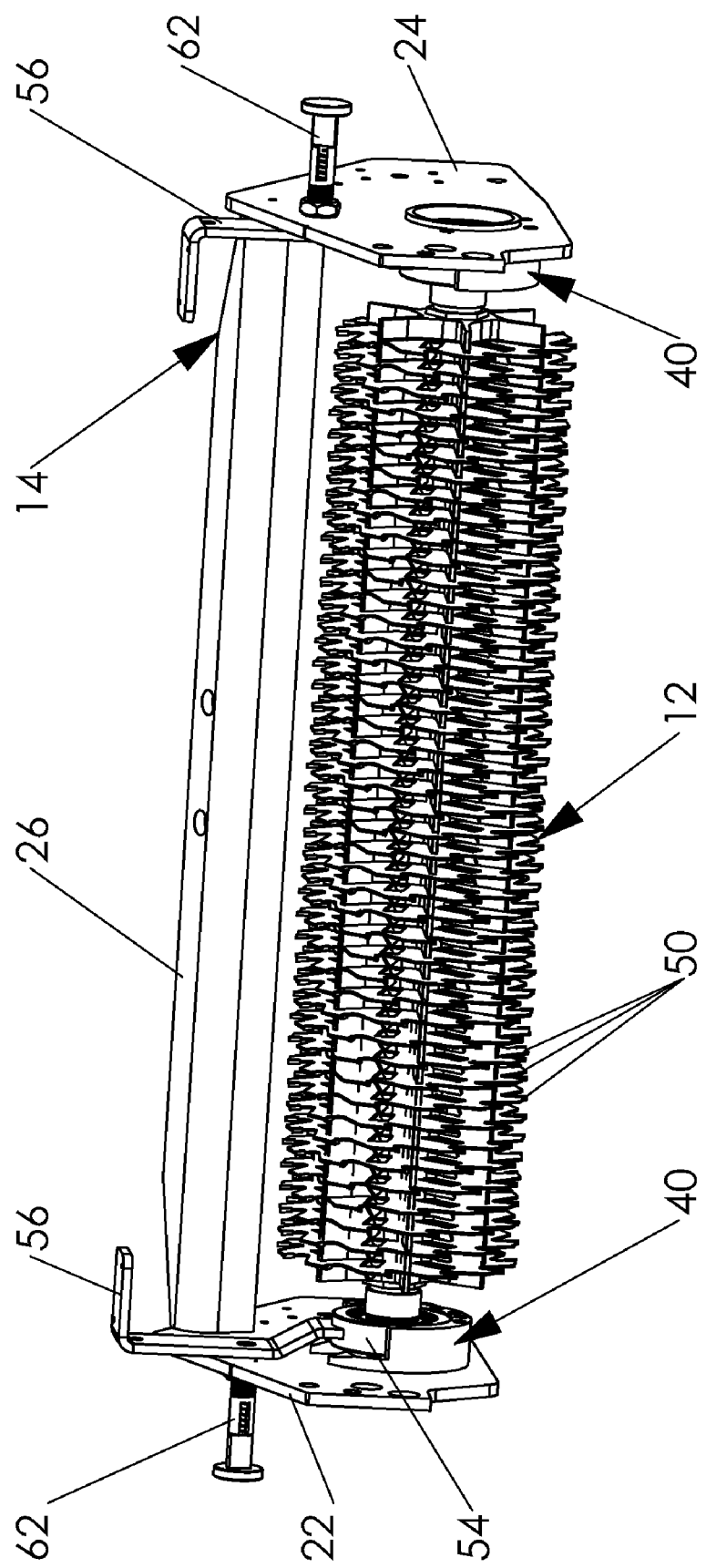
FIG. 8 is a front perspective view of the grass treatment insert shown seated in the bearing sockets on the frame.
Figure 11A:
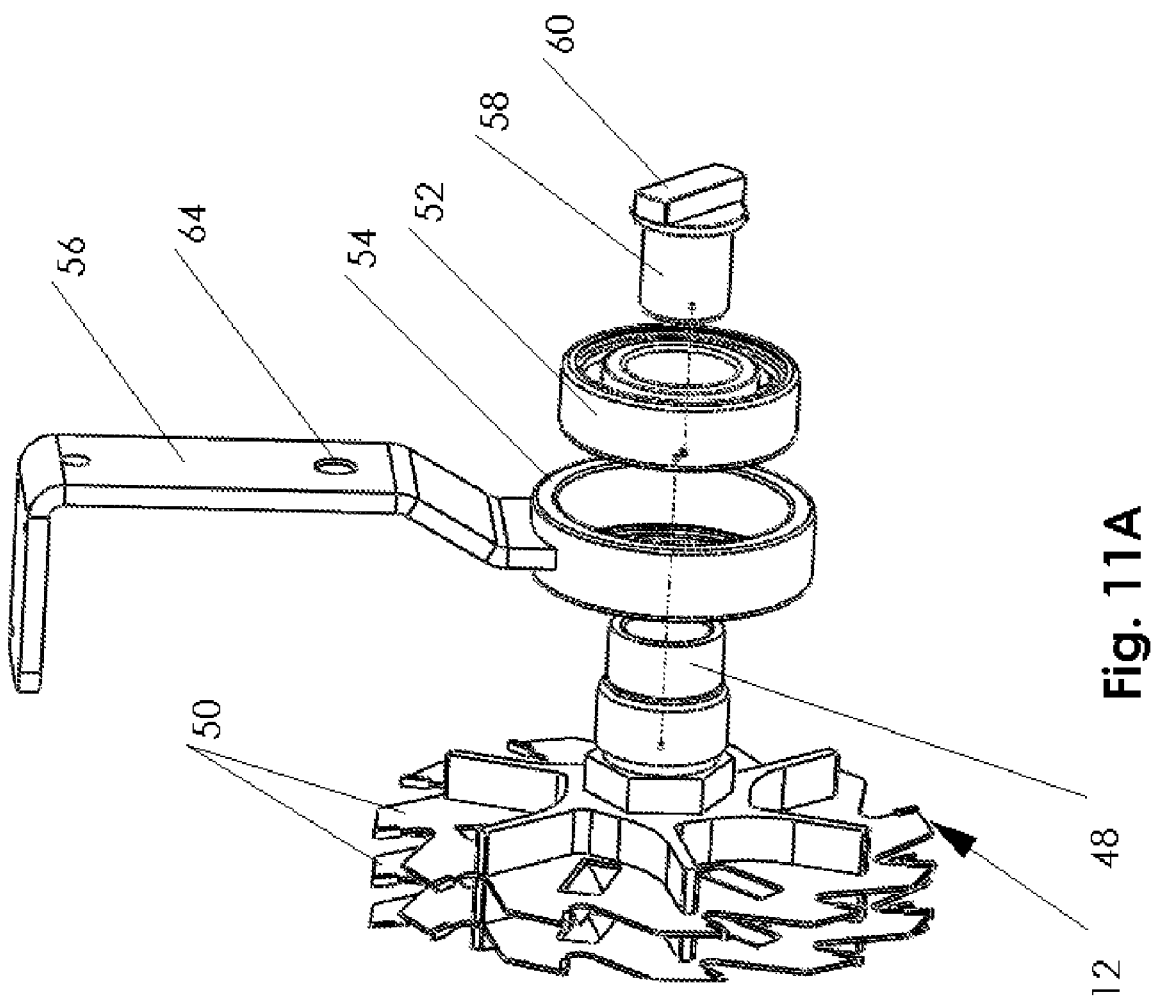
FIG. 11A is a detail on an enlarged scale of a left end of the grass treatment insert shown exploded.
Figure 11B:
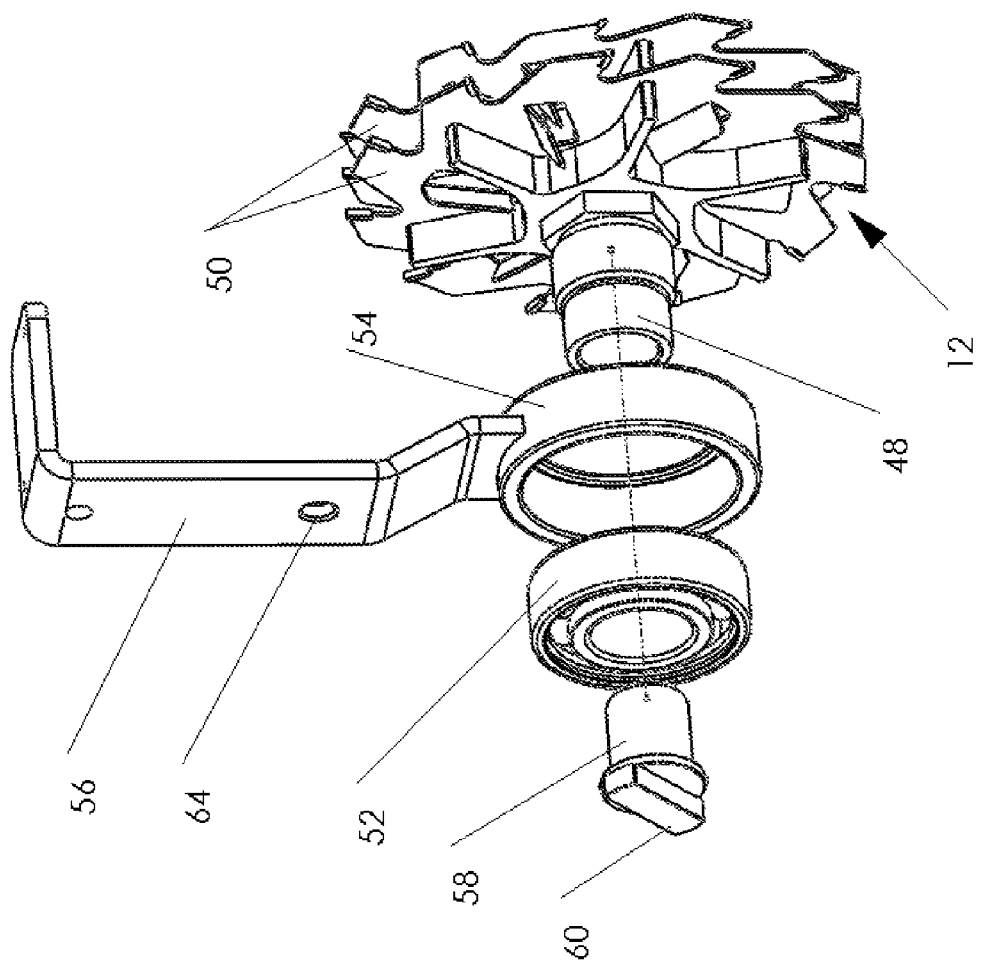
FIG. 11B is a detail on an enlarged scale of a right end of the grass treatment insert shown exploded.

In FIGS. 7 and 8, only sidewalls 22, 24, cross members 26, 28 and bearing sockets 40 of frame 14 are illustrated with other components shown in FIGS. 1-4 removed. Grass treatment insert 12 includes a shaft 48 on which a plurality of spaced apart blades 50, spikes, brushes, or other implements are mounted. As shown in FIGS. 11A and 11B the ends of shaft 48 are received in ball bearings 52 which are housed within a bearing housing 54. L-shaped handles 56 are provided on bearing housings 54 such that grass treatment insert 12 may be lifted with handles 56 and inserted through open top 42 of bearing sockets 40 and seated therein. With continuing reference to FIGS. 11A and 11B, shaft 48 is tapped for receipt of a bolt 58 or other fastener which holds the ball bearings 52 in assembly with shaft 48. The head of bolt 58 on the drive side is formed as a key 60 and bolts 58 on opposite ends of shaft 48 are oppositely threaded such that when shaft 48 is driven by key 60 on the left or right, bolt 58 is threaded in the direction of rotation and is tightened in shaft 48. A retractable spring plunger 62 such as a locking spring plunger is provided on sidewalls 22, 24 above each of bearing sockets 40. A hole 64 is provided in handle 56 which is brought into registry with spring plunger 62 when grass treatment insert 12 is seated in bearing sockets 40 for retaining grass treatment insert 12 in seated position.

Grass treatment insert 12 as described above may be driven from the right or left end. This is advantageous because the hydraulic motor in some greensmowers is attached on the left and with others on the right and for some with a mix of right and left attachment. Frame 14 as heretofore described may be adapted for use with different hydraulic motors, one such adaptation being shown in FIGS. 3 and 4. As illustrated, an adapter plate 66, a spacer 67 and a drive coupler 68 are attached on the outside of right sidewall 22 in registry with aperture 36. A counterweight 70 is attached on the outside of other sidewall 24 to counterbalance the weight of the hydraulic motor (not shown). Drive coupler 68 includes a keyway for receipt of key 60 on the right end of shaft 48 by means of which the shaft 48 is coupled to the hydraulic motor. Alternatively, shaft 48 may be driven with a hydraulic motor from left end by attaching adapter plate 66 and drive coupler 68 to left sidewall 24 and counterweight 70 to right sidewall 22.

Figure 9:
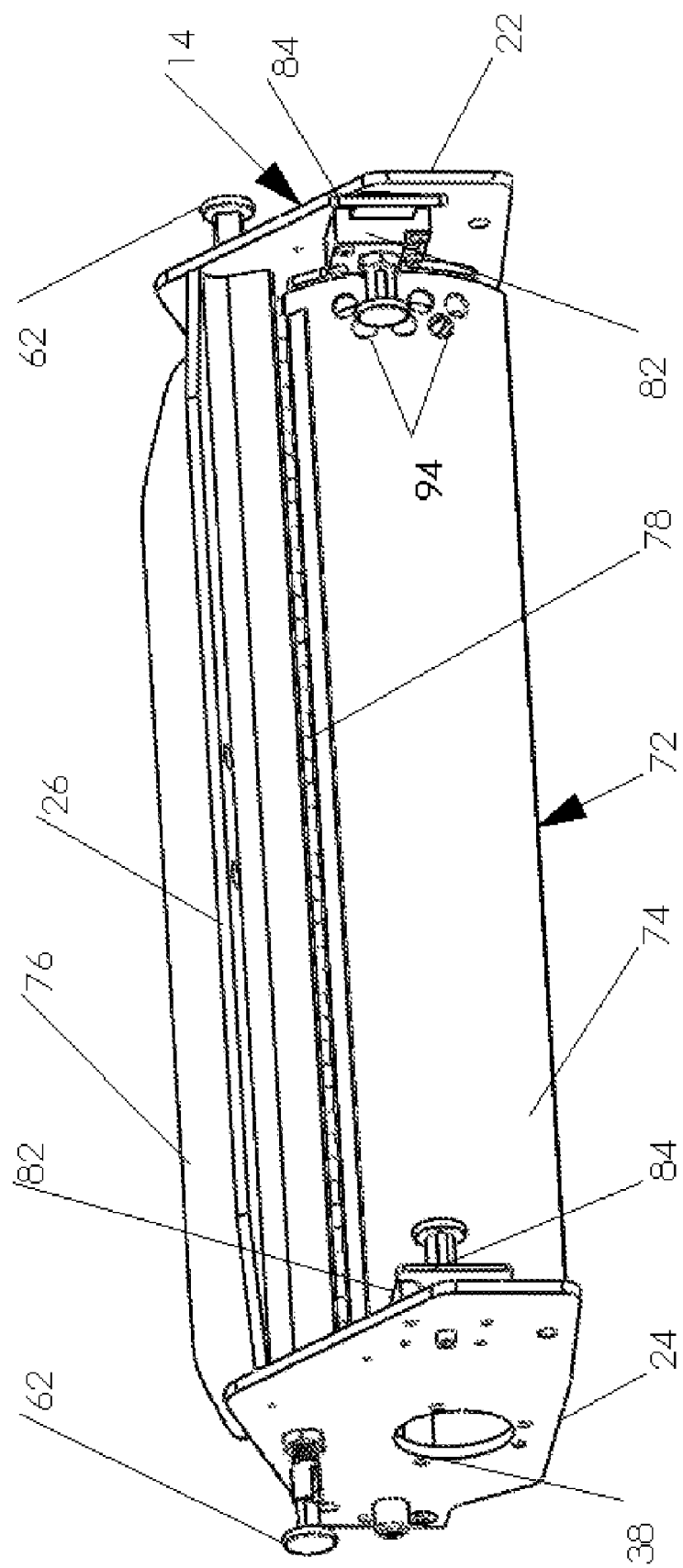
FIG. 9 is a rear perspective view of the frame of the grass treatment unit.
Figure 10:
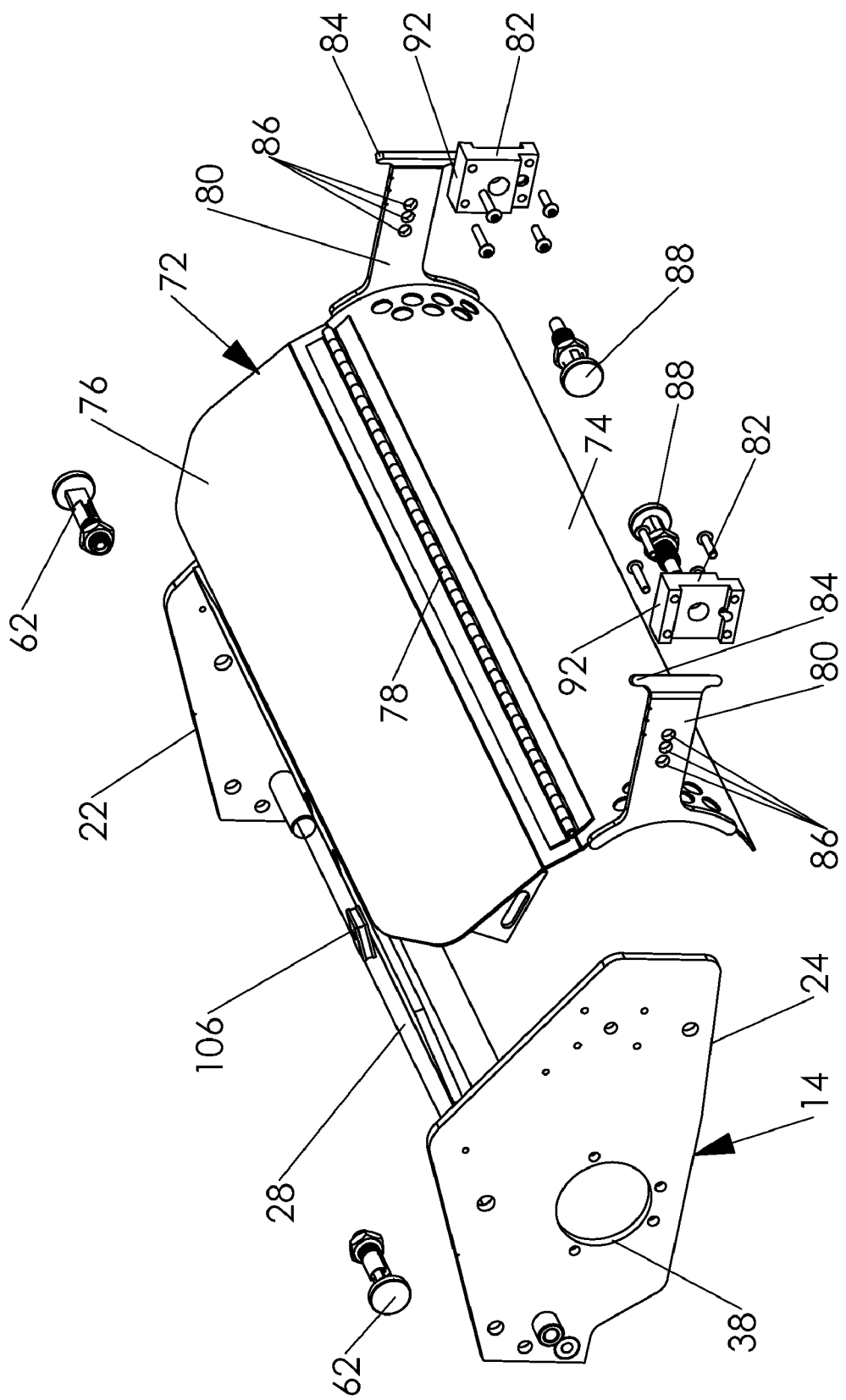
FIG. 10 is a rear partially exploded view of the frame showing a hood exploded from the frame.
Figure 13:
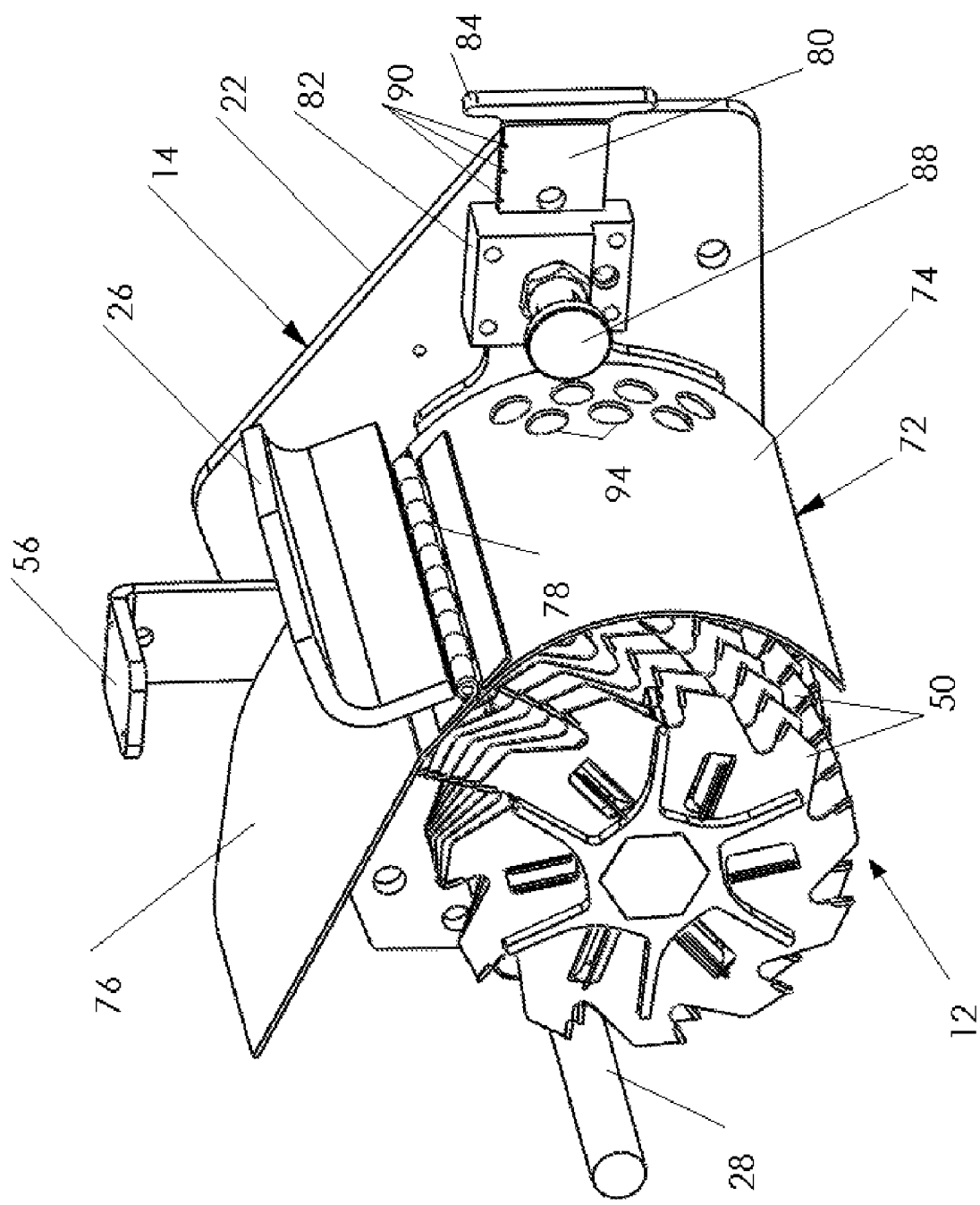
FIG. 13 is a rear perspective view of the hood on an enlarged scale and broken away showing a slide and slide block for use in spacing the hood with respect to the grass treatment insert.
Figure 14:
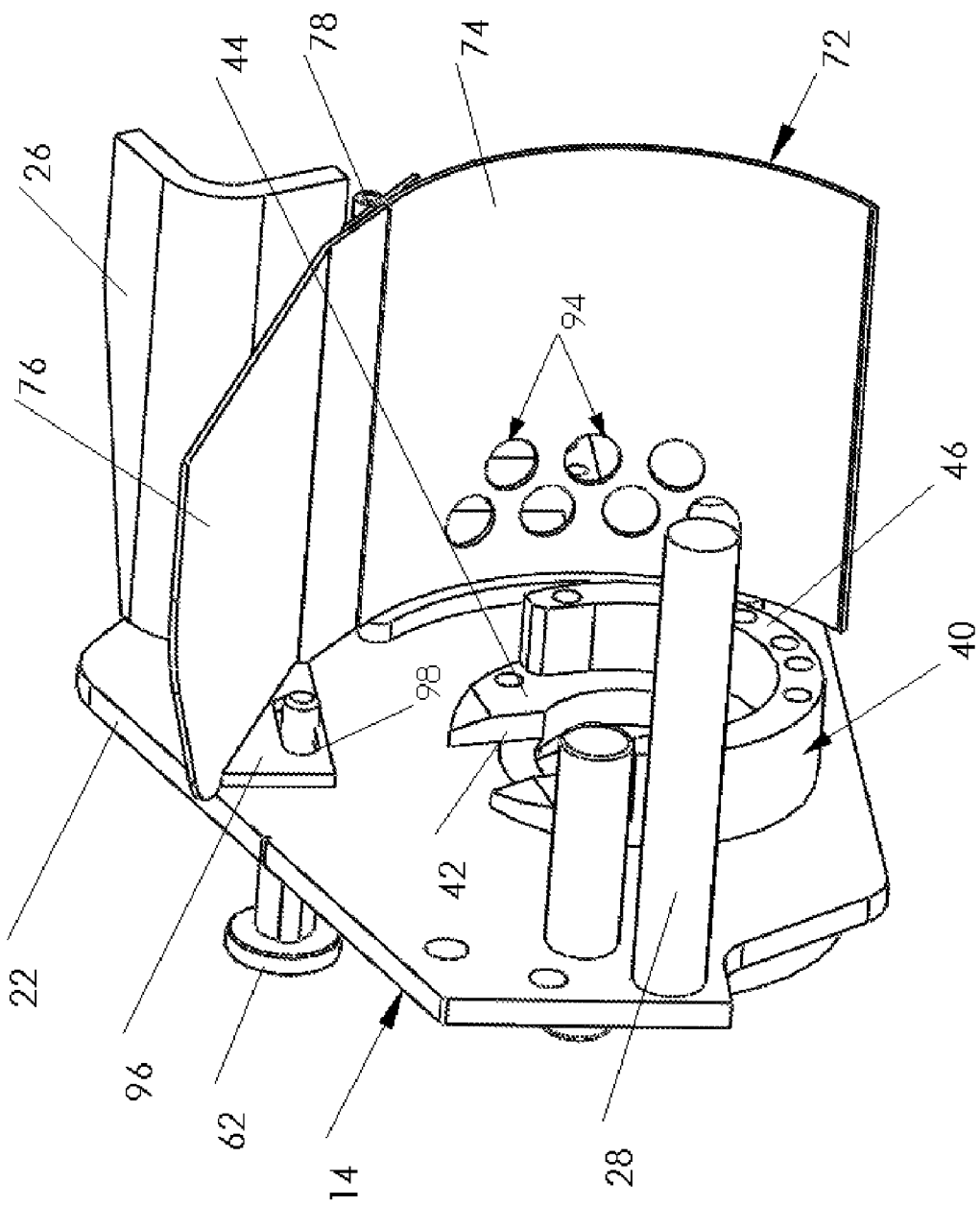
FIG. 14 is a front perspective view on an enlarged scale and broken away showing the hood secured to the sidewall of the frame with the same plunger used to secure the grass treatment insert in the bearing sockets.

Turning to FIGS. 9 and 10, a hood 72 is position behind and extending upwardly and forwardly of grass treatment insert 12 when it is seated in bearing sockets 40. Hood 72 is elongated and bridges sidewalls 22, 24. It includes a curved lower section 74 and a curved upper section 76. Upper section 76 is hinged 78 to lower section 74 and has a lesser degree of curvature than lower section 74. For spacing hood 72 in a selected position with respect to grass treatment insert 12, a slide 80 is attached to the back of lower section 74. Each of slides 80 is slidingly received in a slide block 82, one which is attached to each of sidewalls 22, 24 behind bearing sockets 40. Slide 80 includes a pull 84 by means of which slide 80 may be moved in slide block 82. Slide 80 also includes a series of longitudinally spaced holes 86 (FIG. 10) and slide block 82 includes a retractable spring plunger 88 such as a locking spring plunger which when received in one of holes 86 locks slide 80 in a selected position. As best seen in FIG. 13, a series of notches 90 or other indicia may be used to indicate to an operator which of holes 86 is engaged by plunger 88. A label 92 (FIG. 10) may also be provided on slide block 82 with information as to which hole 86 should be used with a particular grass treatment insert 12 to establish a proper spacing between hood 72 and insert 12 to achieve maximum discharge of the material loosened by the insert 12. Air holes 94 may be provided in hood 72 to draw ambient air into the space between the hood 72 and grass treatment insert 12. Upper section 76 of hood 72 includes side flanges 96 with an elongated slot 98. As seen in FIGS. 14 and 15, retractable spring plunger 62 which is used to lock grass treatment insert 12 in bearing socket 40 may be used to secure upper section 76 to one of sidewalls 22, 24. Elongated slot 98 permits the connection when retractable spring plunger 88 on slide block 82 is in any of holes 86.

Figure 12:
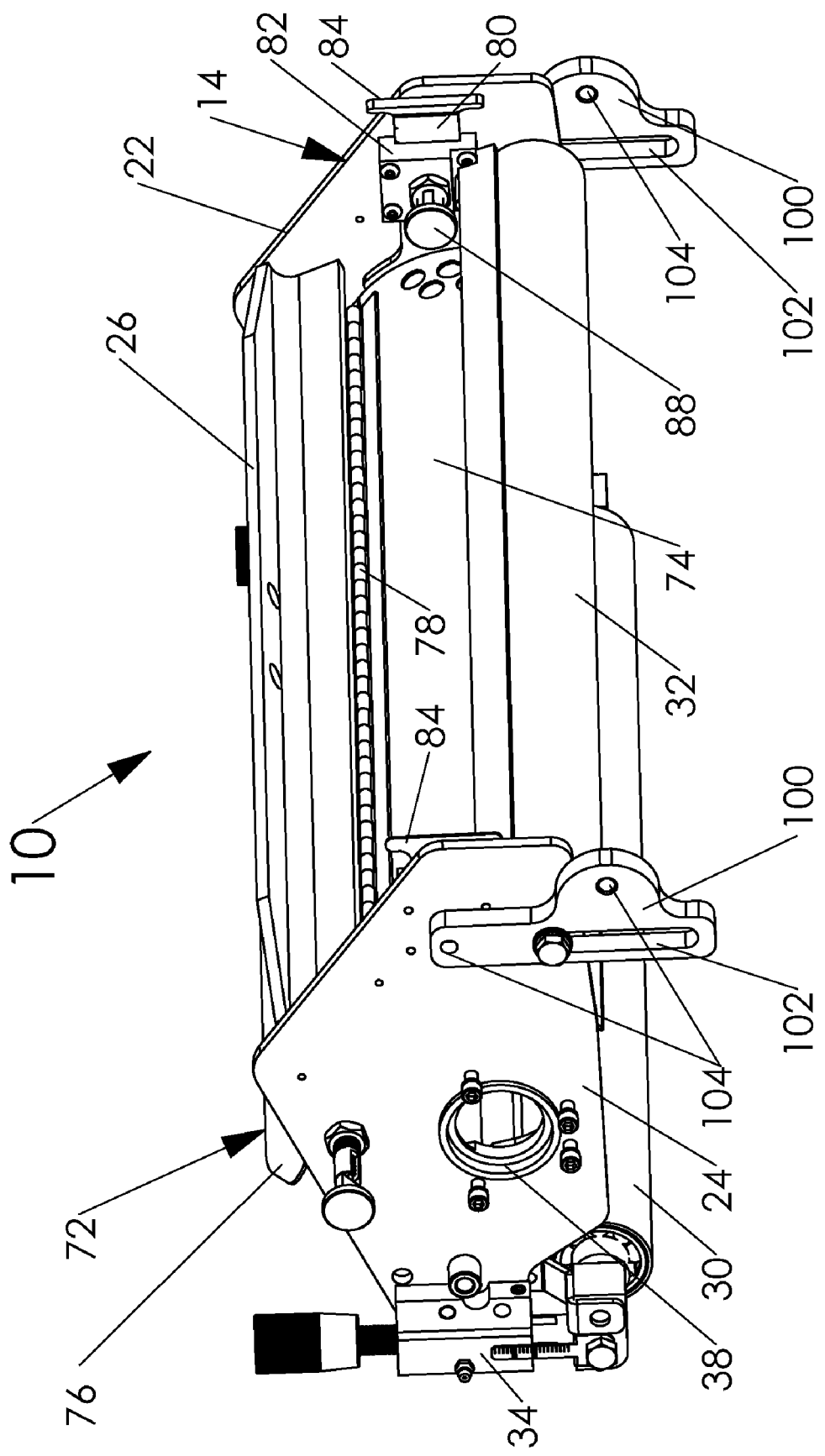
FIG. 12 is a rear view of the grass treatment unit with a kick stand illustrated in use position.

In use, a standard frame 14 as shown in FIG. 7 is outfitted with an adapter 16, 18, 20 or the like suitable for the greensmower to which grass treatment unit is to be used. A suitable adapter plate 66, drive coupler 68 and counterweight 70 is installed, illustrative ones of which are shown in FIGS. 1, 3 and 4. A kick stand 100 for use as shown in FIG. 12 may also be attached to each of sidewalls 22, 24. Kick stands 100 are pivoted to sidewalls 22, 24 on an elongated slot 102. A pair of holes 104 are provided for locking kick stand 100 in rest (FIG. 2) and in use position (FIG. 12) with the same plunger 88 used to lock slide 80 in a selected position.

Prior to inserting grass treatment insert 12, slide 80 may be moved in slide block 82 to open the spacing between hood 72 and bearing sockets 40 and upper section 76 of hood 72 pivoted upward to facilitate the insertion. For this purpose retractable spring plunger 62 is retracted from elongated slot 98 in side flanges 96 of 20 upper section 76. This permits upper section 76 to be pivoted upward where it may be held to cross member 26 with a magnet 106, latch or other suitable fastener (FIG. 10) attached on the back of upper section. Retractable spring plunger 88 is also retracted from holes 86 such that slide 80 may be retracted.

With hood 72 in open position, grass treatment insert 12 may be inserted into frame 14 as shown in FIG. 7. Hood 72 is then slid into the position indicated by label 92. Retracted spring plunger 88 is released locking slide 80 in selected position in slide block 82. Upper section 76 of hood 72 is pivoted about hinge 78 such that elongated slot 98 in flange 96 and hole 64 in handle 56 are aligned. Retracted spring plunger 62 is then released securing grass treatment insert 12 in bearing sockets 40 and upper section 76 of hood 72 to sidewalls 22, 24.

As grass treatment unit 10 is propelled across a green by the greensmower, shaft 48 of grass treatment insert 12 is rotated and performs the greens grooming practice for which it was designed. With rotation of grass treatment insert 12, ambient air is drawn through an air intake path (i.e., from under sidewalls 22, 24 and through air holes 94) whereby grass clippings or other material produced during the grass treatment operation is efficiently discharged into a clippings basket at the front of grass treatment unit 10.

From the above, it will be apparent that the installation and removal of grass treatment insert 12 may be accomplished without tools. It will also be apparent that kick stand 100 may be engaged or disengaged without tools and that slide 80 and upper section 76 of hood 72 may be positioned without tools. There are no bolts or other fasteners to be tightened and loosened which simplifies the installation and removal of grass treatment insert 12 and proper spacing of hood 72 and obviates the need for the services of a skilled mechanic.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A grass treatment unit adapted to fit existing greensmowers, said grass treatment unit comprising
    a frame with first and second sidewalls and at least one connecting cross member, said frame mounted on front and rear rollers,
    an open topped bearing socket attached to the each of the sidewalls for mounting a grass treatment insert for rotation about a shaft between the sidewalls,
    a curved hood having a lower section positioned behind and an upper section extending upwardly and forwardly of the open topped bearing sockets, first and second slides attached rearwardly to the lower section of the curved hood, said first slide slidingly received in a slide block attached to the first sidewall and said second slide slidingly received in a second slide block attached to the second sidewall, movement of the slides in the slide blocks changing the distance of the lower section of the curved hood from the open topped bearing sockets to accommodate grass treatment inserts of different diameters.

2. The grass treatment unit of claim 1 wherein each slide has a plurality of apertures and is slidingly received in the slide block attached to the sidewalls behind the open topped bearing sockets, a spring biased plunger in the slide block which when received in one of the apertures of the slide secures the slide in a selected position.

3. The grass treatment unit of claim 1 wherein the grass treatment insert has a handle by which the grass treatment insert may be lifted in and out of the bearing sockets, said handle having an aperture, a spring biased plunger in each of the sidewalls which when received in the aperture in the handle secures the grass treatment insert in the bearing sockets.

4. A grass treatment unit adapted to fit existing greensmowers, said grass treatment unit comprising
    a frame with sidewalls and at least one connecting cross member, said frame mounted on front and rear rollers,
    an open topped bearing socket with a horseshoe shaped backwall and a crescent shaped front wall on a drive side, said open topped bearing socket attached to the each of the sidewalls for mounting a grass treatment insert for rotation between the sidewalls,
    a hood positioned behind and extending upwardly and forwardly of the open topped bearing sockets, said hood mounted on a slide for spacing the hood in a selected position with respect to the grass treatment insert, said slide having a plurality of holes and being slidingly received in a slide block attached to the sidewalls behind the open topped bearing sockets, a spring biased plunger in the slide block which when received in one of the apertures of the slide secures the hood in a selected position.

5. The grass treatment unit of claim 4 wherein the grass treatment insert is mounted for rotation on a shaft with a handle at opposite ends by which the insert may be lifted in and out of the bearing sockets, said handle having an aperture, a spring biased plunger in each of the sidewalls which when received in the aperture in the handle secures the grass treatment insert in the bearing sockets.

6. The grass treatment unit of claim 4 wherein the bearing sockets are identical and wherein a plurality of holes are provided in the sidewalls for mounting the bearing sockets such that they are canted towards a forward end of the grass treatment unit.

7. The grass treatment unit of claim 6 wherein a kick stand is pivoted on the sidewalls at a rearward end of the grass treatment unit, said kick stand held in use and rest position with the spring biased plunger for the slide.

8. The grass treatment unit of claim 4 wherein the hood is elongated and bridges the distance between the sidewalls, said hood including a lower section and an upper section which is hinged to the lower section, said lower section having greater curvature than the upper section.

9. A removable grass treatment insert adapted to fit a grass treatment unit of an existing greensmower, said removable grass treatment insert comprising a shaft with a plurality of implements mounted thereon, said shaft adapted to be rotated in a direction towards a front of a grass treatment unit, opposite ends of the shaft being mounted in ball bearings which are housed within a bearing housing, an elongated handle with at least one hole adapted for receipt of a spring biased plunger is attached to the bearing housing which may be used to lift the grass treatment insert out of the grass treatment unit without the removal of any other parts or fasteners other than the release of the spring biased plunger from the hole, the shaft is threaded at opposite ends for receipt of a bolt, said bolts threaded into the shaft in the direction of rotation of the shaft for holding the bearing in assembly with the shaft, one of said bolts having a head formed as a key for driving the shaft.

10. The grass treatment insert of claim 9 wherein an aperture is provided in the handle adapted for receipt of a spring biased plunger for locking the grass treatment insert in open topped bearing sockets provided on the sidewalls of a grass treatment unit.

* * * * *